(12) United States Patent
Veach

(10) Patent No.: US 7,818,208 B1
(45) Date of Patent: Oct. 19, 2010

(54) ACCURATELY ESTIMATING ADVERTISEMENT PERFORMANCE

(75) Inventor: Eric Hugh Veach, Bellevue, WA (US)

(73) Assignee: Google Inc., Mountain View, CA (US)

( * ) Notice: Subject to any disclaimer, the term of this patent is extended or adjusted under 35 U.S.C. 154(b) by 1437 days.

(21) Appl. No.: 11/167,581

(22) Filed: Jun. 28, 2005

(51) Int. Cl.
*G06Q 30/00* (2006.01)

(52) U.S. Cl. .................. 705/14.49; 705/14.4; 705/14.5; 705/14.51; 705/14.52; 705/14.53; 705/14.54; 705/14.55

(58) Field of Classification Search ................ 705/14.4, 705/14.49
See application file for complete search history.

(56) References Cited

U.S. PATENT DOCUMENTS

| | | |
|---|---|---|
| 5,794,210 A | 8/1998 | Goldhaber et al. |
| 5,848,396 A | 12/1998 | Gerace |
| 5,918,014 A | 6/1999 | Robinson |
| 5,937,390 A | 8/1999 | Hyodo |
| 5,937,392 A | 8/1999 | Alberts |
| 5,948,061 A | 9/1999 | Merriman et al. |
| 6,006,197 A | 12/1999 | d'Eon et al. |
| 6,006,222 A | 12/1999 | Culliss |
| 6,009,409 A | 12/1999 | Adler et al. |
| 6,014,665 A | 1/2000 | Culliss |
| 6,078,916 A | 6/2000 | Culliss |
| 6,097,566 A | 8/2000 | Heller et al. |
| 6,182,068 B1 | 1/2001 | Culliss |
| 6,260,064 B1 | 7/2001 | Kurzrok |
| 6,285,999 B1 | 9/2001 | Page |
| 6,338,066 B1 | 1/2002 | Martin et al. |
| 6,356,879 B2 | 3/2002 | Aggarwal et al. |
| 6,430,539 B1 | 8/2002 | Lazarus et al. |
| 6,539,377 B1 | 3/2003 | Culliss |
| 6,567,786 B1 | 5/2003 | Bibelnieks et al. |
| 6,963,848 B1 | 11/2005 | Brinkerhoff |
| 7,007,074 B2 | 2/2006 | Radwin |
| 7,130,808 B1 | 10/2006 | Ranka et al. |
| 7,136,875 B2 | 11/2006 | Anderson et al. |
| 7,370,002 B2 | 5/2008 | Heckerman et al. |
| 7,383,258 B2 | 6/2008 | Harik et al. |
| 7,406,434 B1 | 7/2008 | Chang et al. |

(Continued)

FOREIGN PATENT DOCUMENTS

WO    WO 01/09789 A1    2/2001

(Continued)

OTHER PUBLICATIONS

Shun-Zheng Yu et al., "Dynamic Web pages for location-based services": Book ( Proceedings of the IASTED International Conference on Wireless and Optical Communications), pp. 457-463: Jul. 17-19, 2002.*

(Continued)

*Primary Examiner*—Jean D. Janvier
(74) *Attorney, Agent, or Firm*—Harrity & Harrity, LLP

(57) ABSTRACT

An on-line advertising system provides advertisements to users. At least one candidate advertisement is identified in response to an advertisement trigger. At least one key is identified relating to features of the candidate advertisement, the advertisement trigger, or a combination of the candidate advertisement and the advertisement trigger. Candidate advertisement performance is estimated based on historical data relating to the key.

21 Claims, 9 Drawing Sheets

U.S. PATENT DOCUMENTS

| | | |
|---|---|---|
| 7,415,423 B2 | 8/2008 | Ranka et al. |
| 2002/0103698 A1 | 8/2002 | Cantrell |
| 2002/0147637 A1 | 10/2002 | Kraft et al. |
| 2003/0023598 A1 | 1/2003 | Janakiraman et al. |
| 2003/0032409 A1* | 2/2003 | Hutcheson et al. ......... 455/414 |
| 2003/0046161 A1 | 3/2003 | Kamangar et al. |
| 2004/0054577 A1* | 3/2004 | Inoue et al. .................. 705/14 |
| 2004/0059708 A1 | 3/2004 | Dean et al. |
| 2004/0059712 A1 | 3/2004 | Dean et al. |
| 2004/0267723 A1 | 12/2004 | Bharat |
| 2005/0021397 A1 | 1/2005 | Cui et al. |
| 2005/0251444 A1 | 11/2005 | Varian et al. |
| 2006/0026071 A1 | 2/2006 | Radwin |
| 2006/0288100 A1* | 12/2006 | Carson et al. ............... 709/224 |
| 2007/0156514 A1 | 7/2007 | Wright et al. |
| 2007/0156621 A1 | 7/2007 | Wright et al. |
| 2007/0156887 A1 | 7/2007 | Wright et al. |
| 2010/0082439 A9* | 4/2010 | Patel et al. ............... 705/14.72 |

FOREIGN PATENT DOCUMENTS

| | | |
|---|---|---|
| WO | WO 01/15053 A2 | 3/2001 |
| WO | WO 03/023680 A1 | 3/2003 |

OTHER PUBLICATIONS

Office Action from U.S. Appl. No. 11/321,076, dated May 6, 2010, 17 pages.

International Preliminary Report on Patentability dated Jul. 10, 2008 issued in international application No. PCT/US2006/062710 (corresponding U.S. Appl. No. 11/321,046), 8 pages.

Office Action from U.S. Appl. No. 11/321,046, dated Feb. 19, 2009, 23 pages.

Office Action from U.S. Appl. No. 11/321,076, dated Feb. 18, 2009, 22 pages.

Office Action from U.S. Appl. No. 11/321,064, dated Feb. 18, 2009, 26 pages.

International Preliminary Report on Patentability dated Jul. 10, 2008 issued in International Application No. PCT/US2006/062673 (corresponding U.S. Appl. No. 11/321,064), 8 pages.

S. Brin and L. Page: The Anatomy of a Large-Scale Hypertextual Search Engine, 7th International World Wide Web Conference, 1998, 20 pages.

M. Fang et al.: Computing Iceberg Queries Efficiently, Proceedings of the 24th Very Large Data Bases Conference, 1998, 12 pages.

* cited by examiner

ACCURATELY ESTIMATING ADVERTISEMENT PERFORMANCE

BACKGROUND

1. Field of the Invention

Implementations described herein relate to on-line advertising and, more particularly, to predicting the performance of such advertising.

2. Description of Related Art

An on-line advertising system may provide advertisements to users when they visit certain web pages. When a particular advertisement is of interest to a user, the user may perform various actions, such as selecting ("clicking") the advertisement, which may take the user to a web page belonging to the advertiser associated with the advertisement. Additional examples of user actions may include signing-up for services at the target web page, placing an order, etc.

On-line advertising systems may charge the advertisers based on the number of times their advertisements are shown to users (called advertisement "impressions") and/or based on the number of times an advertisement is selected by the users. For example, an on-line advertising system may calculate a charge based, at least in part, on the clicks that an advertisement receives. Charges may also be calculated based on other characteristics as well, such as time of day, location of the user, age or other demographic information associated with the user, or the like.

The effectiveness of an online advertisement is often reflected by the number of times that a desirable user action occurs. For example, the number of times that the advertisement is clicked by a user. Accordingly, it is desirable to display advertisements to the user having the highest likelihood of the desirable user action taking place. Conventional advertisement selection processes fail to accurately predict the likelihood that a user action relating to an advertisement will occur.

SUMMARY

One aspect is directed to a method for estimating on-line advertisement performance. The method may include identifying at least one candidate advertisement in response to an advertisement trigger. A set of at least one key may be identified relating to features of at least one of the candidate advertisement, the advertisement trigger, or a combination of the candidate advertisement and the advertisement trigger. Candidate advertisement performance may be estimated based on historical data relating to the at least one key.

Another aspect is directed to an on-line advertising device. The device may include means for observing an advertisement trigger. The device may further include means for identifying a candidate advertisement in response to the advertisement trigger. The device may also include means for identifying keys associated with statistically relevant features of at least one of the candidate advertisement or the advertisement trigger. The device may further include means for calculating a statistical effect of each identified key on a combination of the advertisement trigger and the candidate advertisement associated with the identified key. Means is also provided for calculating an estimated user action rate for the combination of the advertisement trigger and the candidate advertisement based on the calculated statistical effect of each identified key.

Yet another aspect of the invention is directed to an on-line advertisement selection system that may include a processing engine configured to generate statistical information for a plurality of keys associated with a plurality of query/advertisement pairs. An advertisement selection server may be configured to receive a user search query and set of candidate advertisements, where the advertisement selection server may be further configured to estimate a performance of each candidate advertisement based on the statistical information.

Still another aspect of the invention is directed to a method that may include receiving an advertisement trigger from a user; identifying a candidate advertisement for display to the user; identifying a set of keys having characteristics associated with the advertisement trigger and/or the candidate advertisement; retrieving historical statistical information for each key in the set of keys; calculating a model parameter for each key in the set of keys, where the model parameter is representative of a statistical relevance of the characteristics associated with the key and based on the retrieved historical statistical information; and calculating an estimated user action rate for the candidate advertisement based on a prior probability and each of the calculated model parameters.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Overview

Implementations consistent with the principles of the invention may estimate the performance of an advertisement. In this way, advertisement selection and ranking may be more accurately determined.

Estimated performance of an advertisement may be calculated by initially identifying a set of features or combination of features associated with the advertisement and/or a received query. These features may include, for example, geographic location of the user from which the query was received, geographic location of the advertisement provider, text of the query, text of the advertisement, text of the linked page associated with the advertisement, etc. Data regarding the historical occurrence of each feature may then be compiled and analyzed to generate an estimated likelihood that a particular user action relating to the advertisement will occur when served along with the received query.

System Description

Figure 1:
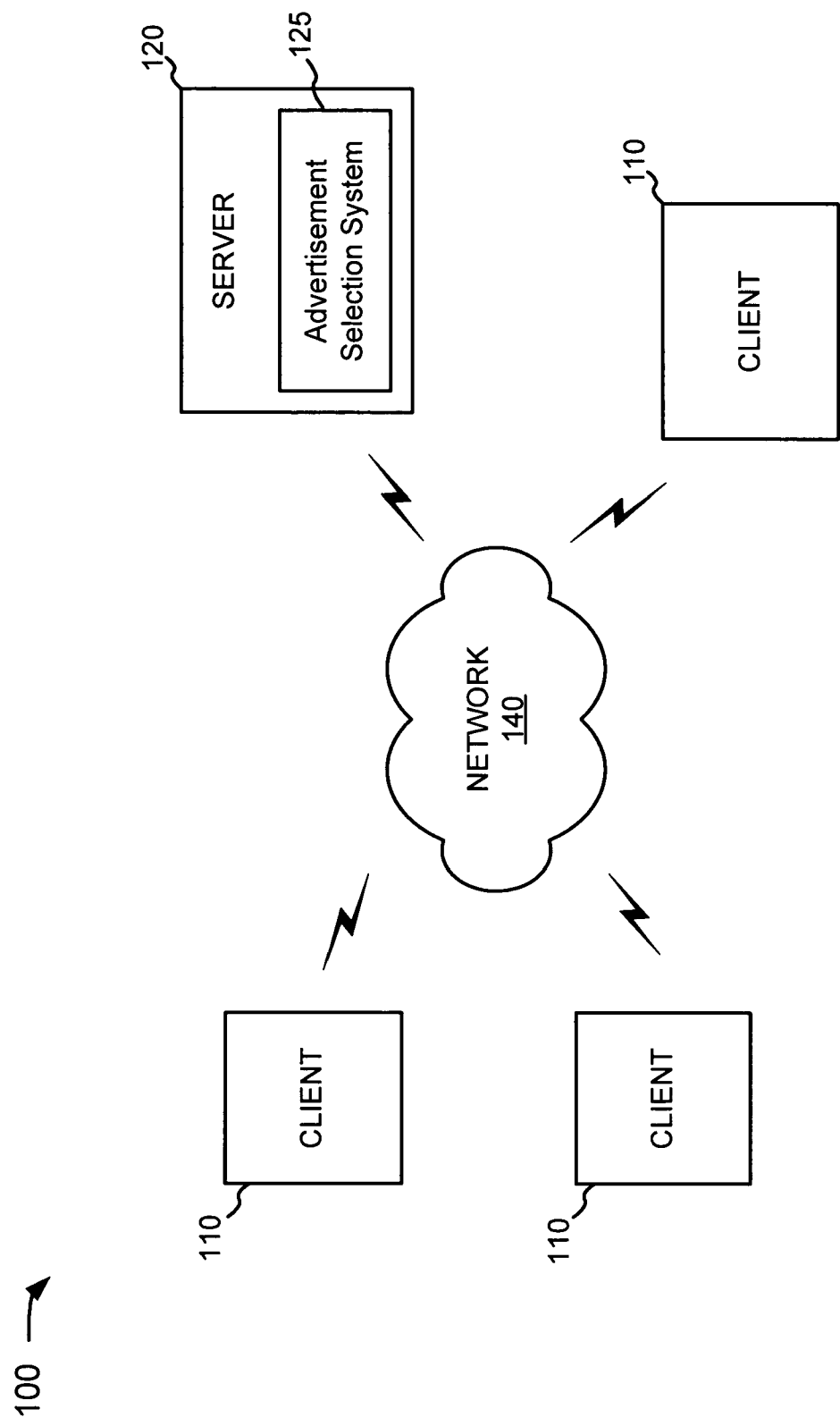
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include multiple clients 110 connected to a server 120 via a network 140. Network 140 may include a local area network (LAN), a wide area network (WAN), a telephone network, such as the Public Switched Telephone Network (PSTN), an intranet, the Internet, or a combination of networks. Clients 110 and server 120 may connect to network 140 via wired, wireless, or optical connections. Three clients 110 and one server 120 have been illustrated as connected to network 140 for simplicity. In practice, there may be more clients and/or servers. Also, in some instances, a client may perform one or more functions of a server and a server may perform one or more functions of a client.

A client 110 may include a device such as a personal computer, a wireless telephone, a personal digital assistant (PDA), a lap top, or another type of computation or communication device, a thread or process running on one of these devices, and/or an object executable by one of these devices.

Server 120 may include a server device, or a combination of devices, that processes, searches, and/or maintains documents and images in a manner consistent with the principles of the invention. A "document," as the term is used herein, is to be broadly interpreted to include any machine-readable and machine-storable work product. A document may include, for example, an e-mail, a web document, a web site, a file, a combination of files, one or more files with embedded links to other files, a news group posting, a blog, a web advertisement, etc. In the context of the Internet, a common document is a web document. Web documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Server 120, in one implementation, may include a search engine that receives search queries from clients 110 and returns links to results relevant to the search queries back to clients 110. In an implementation consistent with the invention, server 120 may also return advertisements with the search query results. For example, third parties may contract with the operator of server 120 to display their advertisements when their advertisements are relevant to a search query. In other words, server 120 may implement an on-line advertising system.

Server 120 may implement a number of processes that assist in its operation as an advertising system. Consistent with an aspect of the invention, server 120 may include, or be associated with, a tool, referred to herein as advertisement selection system 125, that assists in selecting, ranking, and presenting advertisements to users along with the search query results. Advertisement selection system 125 will be described in more detail below.

In one implementation consistent with principles of the invention, advertisement selection system 125 may be implemented as hardware and/or software within server 120. In another implementation, advertisement selection system 125 may be implemented as hardware and/or software within one or more devices separate from or including server 120.

Exemplary Client/Server Architecture

Figure 2:
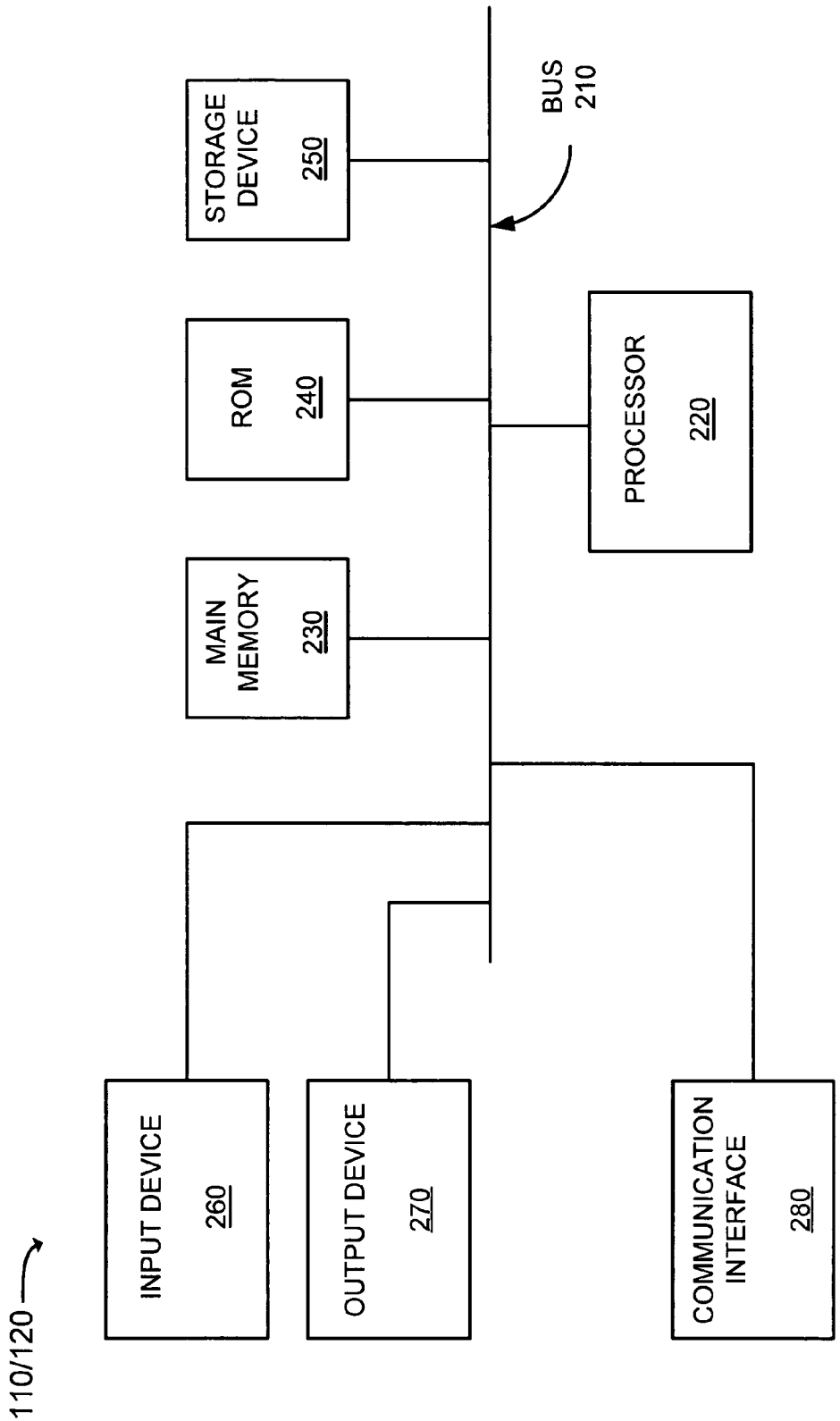
FIG. 2 is an exemplary diagram of a client or server shown in FIG. 1.

FIG. 2 is an exemplary diagram of a client 110 or server 120. Client/server 110/120 may include a bus 210, a processor 220, a main memory 230, a read only memory (ROM) 240, a storage device 250, an input device 260, an output device 270, and a communication interface 280. Bus 210 may include conductors that permit communication among the components of client/server 110/120.

Processor 220 may include a conventional processor, microprocessor, or processing logic that interprets and executes instructions. Main memory 230 may include a random access memory (RAM) or another type of dynamic storage device that may store information and instructions for execution by processor 220. ROM 240 may include a conventional ROM device or another type of static storage device that may store static information and instructions for use by processor 220. Storage device 250 may include a magnetic and/or optical recording medium and its corresponding drive.

Input device 260 may include one or more conventional mechanisms that permit a user to input information to client/server 110/120, such as a keyboard, a mouse, a pen, voice recognition and/or biometric mechanisms, etc. Output device 270 may include one or more conventional mechanisms that output information to the user, including a display, a printer, a speaker, etc. Communication interface 280 may include any transceiver-like mechanism that enables client/server 110/120 to communicate with other devices and/or systems. For example, communication interface 280 may include mechanisms for communicating with another device or system via a network, such as network 140.

As will be described in detail below, server 120, consistent with the principles of the invention, may perform advertisement selection operations through advertisement selection system 125. In one implementation, advertisement selection system 125 may be stored in a computer-readable medium, such as memory 230. A computer-readable medium may be defined as one or more physical or logical memory devices and/or carrier waves.

The software instructions defining advertisement selection system 125 may be read into memory 230 from another computer-readable medium, such as data storage device 250, or from another device via communication interface 280. The software instructions contained in memory 230 may cause processor 220 to perform processes that will be described later. Alternatively, hardwired circuitry or other logic may be used in place of, or in combination with, software instructions to implement processes consistent with the invention. Thus, implementations consistent with the principles of the invention are not limited to any specific combination of hardware circuitry and software. Additionally, multiple computing devices may function together to implement the functionality of a single server 120 or of advertisement selection system 125.

Exemplary Advertisements

Before describing advertisement selection system 125 in additional detail, it may be helpful to further describe exemplary advertisement systems that may be implemented by server 120. Accordingly, examples of on-line advertisements will now be described with reference to FIGS. 3A, 3B, 4A, and 4B.

Figure 3A:
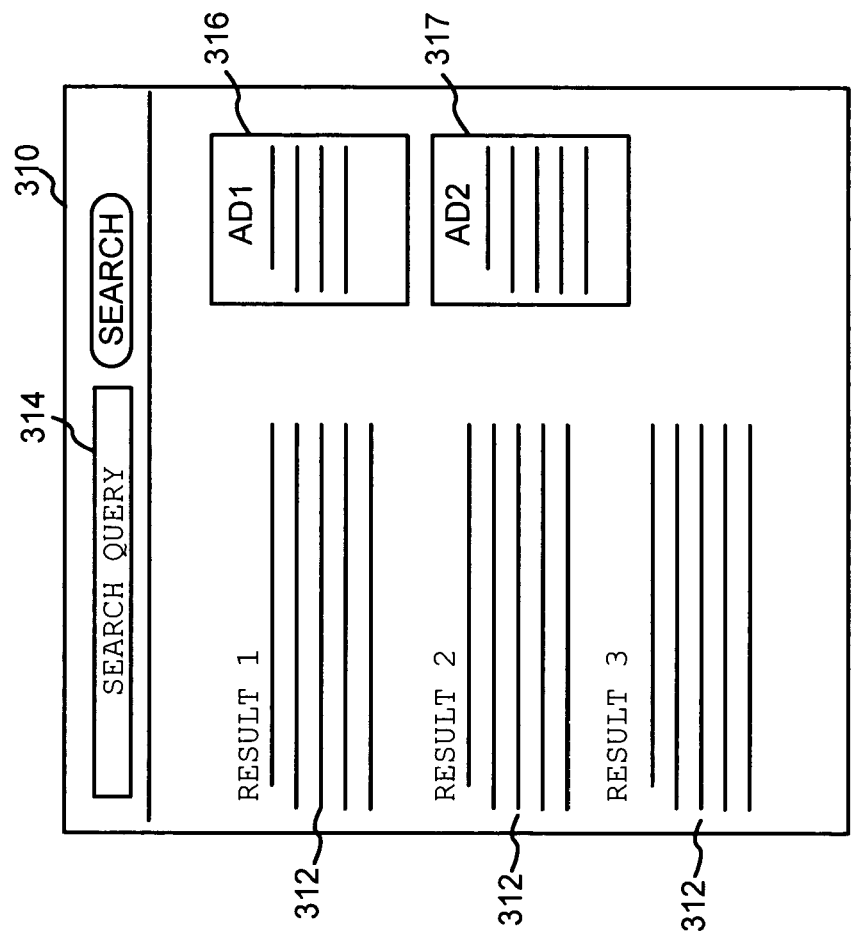
FIG. 3A is a diagram illustrating an exemplary web page including on-line advertisements.

FIG. 3A is a diagram illustrating an exemplary web document 310 that may be provided by server 120, when functioning as an advertisement system and a search engine, to clients 110. In this example, web document 310 is a web page that displays results 312 that relate to a search query 314 submitted by one of clients 110. Web document 310 may additionally display advertisements, such as advertisements 316 and 317, which may include text and/or graphical advertisements that were determined by server 120 to be relevant to results 312 and/or search query 314. Advertisements may also be referred to as "creatives".

Advertisements 316 and 317 may be provided to the operator of server 120 (also called the content host) by advertisers that would like their advertisements displayed to clients 110 that access server 120, such as users who are performing searches through server 120. The advertisement system may charge the advertisers when a user clicks one of the displayed advertisements 316 and 317. Alternatively, charges may be incurred upon the occurrence of additional user actions, such as order placement, target web site registration, etc.

Figure 3B:
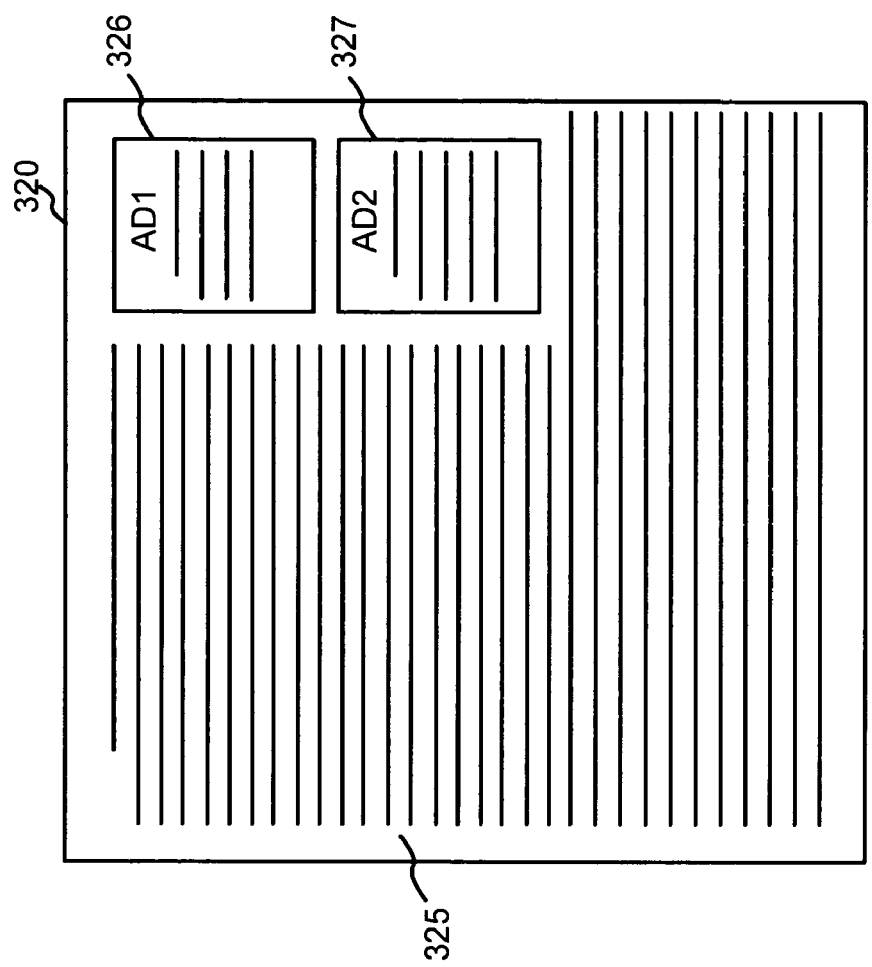
FIG. 3B is a diagram illustrating another exemplary web page including on-line advertisements.

FIG. 3B is a diagram illustrating another exemplary web document 320. In this example, web document 320 contains content 325 and one or more advertisements 326 and 327. Web document 320 may generally be hosted by a party distinct from the advertisement system that operates server 120 to serve the advertisements. For example, web document 320 may include a web page from a web site targeted to auto enthusiasts. Advertisements 326 and 327 may be advertisements selected by and displayed on web document 320 by the content host. When a client 110 visits web document 320, a web browser at the client may obtain content 325 from the operator of web document 320 and advertisements 326 and 327 from server 120. The advertisements may be selected to generally be relevant to the content of web document 320 or to the content of the web site of which web document 320 is a member. The client web browser may assemble content 325 and advertisements 326 and 327 into a single document for display to the user.

As with advertisements 316 and 317, advertisements 326 and 327 may be provided to server 120 by advertisers. When a user clicks on one of advertisements 326 or 327, the operator of server 120 may charge the advertiser and credit the operator of web document 320. Accordingly, in this example, the operator of web document 320 agrees to display advertisements provided by server 120 in exchange for monetary compensation when visitors to web document 320 click on one of the displayed advertisements. As described above, more complex user actions may also trigger the charging of the advertiser.

Figures 4A, 4B:
FIGS. 4A and 4B are diagrams illustrating an exemplary advertisement submitted by an advertiser.

FIG. 4A is a diagram illustrating an exemplary advertisement 400 submitted by an advertiser. The advertiser may include advertisement text 410 and trigger text 420. In this example, the advertiser would like advertisement text 410 displayed when a user of the search engine includes the terms "jewelry" in their search query. The advertiser may also enter a link 430 for the advertisement and anchor text 440 that the advertiser would like displayed with link 430.

FIG. 4B is a diagram illustrating a rendered version of advertisement 400 provided to client 110. Advertisement 400 may be displayed, for example, as advertisement 316 or 317 (FIG. 3), in response to a user search query 314 that includes the term "jewelry."

Advertisement Selection System

The operation of advertisement selection system 125 will now be described in detail.

Figure 5:
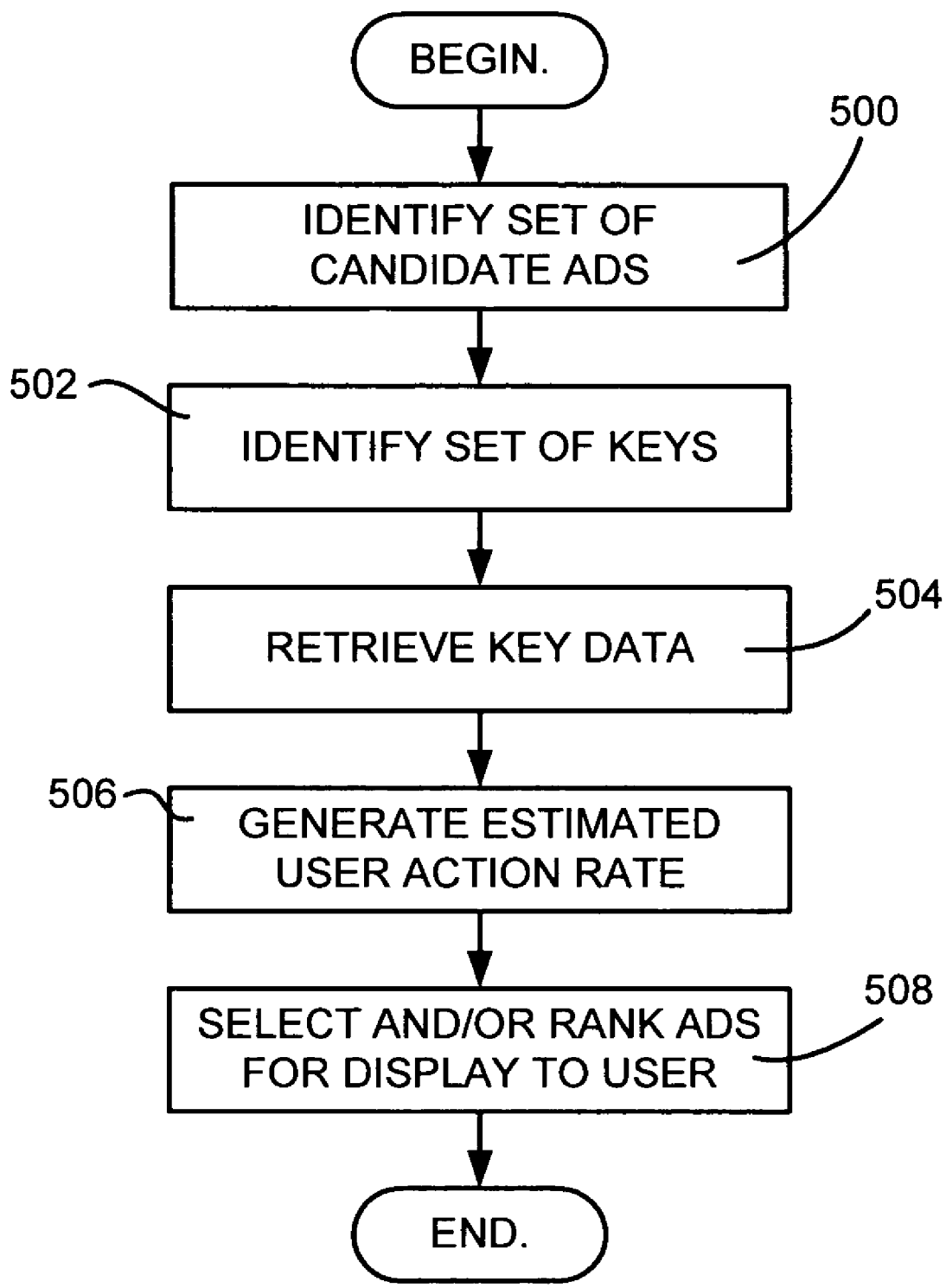
FIG. 5 is a flow chart illustrating exemplary high-level operations that may be performed by the advertisement selection system of FIG. 1.

FIG. 5 is a flow chart illustrating exemplary high-level operations that may be performed by advertisement selection system 125. As described briefly above, advertisement selection system 125 may operate to identify, rank, and display advertisements in response to received user queries. Initially, upon receipt of a query, either in real time or extracted from a historical log of past queries, advertisement selection system 125 identifies a set of either candidate advertisements (in the case of new queries) or served advertisements (in the case of past queries) (act 500). Once a set of candidate advertisements has been identified, a set of keys relating to characteristics of the advertisements, the query or a combination of both may be identified (act 502).

Although candidate advertisements have been discussed above with respect to a received query, it should be understood that candidate advertisements may also be identified based on non-query information, such as the content of a web document or other document in which the advertisement is displayed, such as in web document 320 of FIG. 3B. In such a non-query implementation, the identified keys may relate to features of the candidate advertisements and/or features of the web document on which they are to be displayed. Collectively, a web document for displaying advertisements and a received query may be referred to as "advertisement triggers", each initiating the advertisement performance estimate process described herein.

As defined herein, a "key" may be an arbitrary string of information relating to any identifiable feature or combination of features associated with the received query or the advertisements identified for display with the search results. In should be further understood that the "query" may include additional information beyond the search terms input by the user. For example, each received query may also include information relating to a broader category or topic associated with the query, the geographic location of the user who initiated the query, the search preferences employed by the user, the type of web browser or other application used to initiate the search, the language preference of the user, the user's interne protocol (IP) address, the ad click or user action history associated with the user and/or the user's IP address, the user's search history, the date and time the query was received, etc.

In addition to query-related features, each key may additionally or alternatively include features related to the identified advertisements. Advertisement-related features may include the advertiser name, the keyword targets of the ad, the text or content of the ad, the destination URL (uniform resource locator) of the ad, the geographic location of the advertiser, the language of the ad, etc.

Keys may be then represented as a set of tag-value pairs, where the tag identifies a particular feature type, and the value identifies the corresponding feature value. For example, the notation "user_country: Canada" represents a tag-value pair that indicates that the user's country of residence is Canada. A key consisting of several tag-value pairs may be written as a list enclosed in parentheses. For example, (user_country: "Canada", query_text: "camping gear") denotes a key consisting of two tag-value pairs, both of which must be satisfied in order for the given key to be selected.

Examples of keys may include: (query_word: "free"), i.e. the user's search query contains the word "free"; (user_country: "USA", user_language: "English"), i.e. the user is located in the USA and the user's selected interface language is English; (destination_page_text: "swimming pool", query_word: "pool", browser: "Safari"), i.e. the destination page of the advertisement link contains the phrase "swimming pool", the user's search contains the word "pool", and the user is using the Safari browser; etc.

By using this additional information query and advertisement information, advertisement selection system 125 may more accurately estimate user action rates (UARs) for the identified advertisements in response to the received query, in the manner described in additional detail below.

In one implementation consistent with principles of the invention, key sets may comprise a broad range of advertisement and query features or characteristics. Alternatively, key sets may include predetermined or designated combinations of query and advertisement features or characteristics. In one implementation, keys may be selected based on predetermined rules associated with the advertisement trigger. For example, a rule may specify that if the advertisement trigger is a search query, then a key will be selected for each pair of adjacent words in the user's search query. According to this rule, the search query "anniversary flowers seattle" would generate the two keys (query_phrase: "anniversary flowers") and (query_phrase: "flowers seattle"). Additional keys may be generated by other rules associated with the advertisement trigger or the advertisement itself. Although this technique may result in a number of keys being identified, the technique may be used to indicate types of information which are considered useful and hence are suitable for inclusion in the key set for the trigger/advertisement pair. As will be described in additional detail below, the selection of applicable or relevant keys may be further refined from an initial set to reduce the likelihood that irrelevant or redundant keys are included within the UAR estimation process.

Following initial key selection, historical data regarding each key is retrieved from storage associated with advertisement selection system 125, such as storage device 250 described above (act 504). In one implementation consistent with principles of the invention, the historical data may include information or statistics relating to the number of impressions associated with the key, the number of user actions (e.g, clicks, orders, etc.) associated with the key, etc. As described above, the term "impressions" relates to the number of times the advertisement was displayed in conjunction with the selected key. Further, the term "user actions" relates to the number of times a particular user action associated with the advertisement occurred. For example, it may be determined that for a key such as (user_country: "USA", advertiser_country: "Canada"), a matching advertisement was displayed 1000 times and acted upon 30 times, representing a historical user action rate of 0.03. In one embodiment, such historical information may be retrieved from various logs maintained by server 120, such as query logs and user action logs.

The historical information for each key identified in act 502 is then compiled in substantially real-time and a prediction model is applied thereto to generate an estimated UAR or user action probability for each query/advertisement pair (act 506). The estimated UAR may then be used to select, rank or otherwise classify advertisements for potential display to the user in response to the received query (act 508).

A prediction model consistent with principles of the invention has the following general structure. The estimated likelihood that a given user action will occur for a given trigger/advertisement pair is a function of a prior likelihood that the action will occur, and one or more model parameters associated with the selected keys for the given trigger/advertisement pair. The model parameters are calculated using an iterative process that attempts to solve for the parameter values that produce the best fit of the predicted user action probabilities to the actual historical data used for training.

The prior likelihood of a user action may be set to a predetermined constant, or it may depend on various features associated with the trigger/advertisement pair, such as IR (information retrieval) scores, the position and size of the displayed advertisement, etc. For example, an advertisement that appears at the top of a search result page may be assigned a higher prior likelihood of a user action occurring than a similar advertisement that appears at the bottom of a search result page.

The model parameters associated with each key may consist of a single parameter, such as a multiplier on the probability or odds of the desired user action occurring. Alternatively, each key may have several model parameters associated with it that may affect the predicted probability of a user action in more complex ways.

In the following description, various odds and probabilities are used. The odds of an event occurring and the probability of an event occurring are related by the expression: probability=odds/(odds+1). For example, if the odds of an event occurring are ½ (i.e., the odds are "1:2" as it is often written), the corresponding probability of the event occurring is ⅓. According to this convention, odds and probabilities may be considered interchangeable. It is convenient to express calculations in terms of odds rather than probabilities because odds may take on any non-negative value, whereas probabilities must lie between 0 and 1. However, it should be understood that the following implementation may be performed using probabilities exclusively, or using some other similar representation such as log(odds), with only minimal changes to the description below.

Figure 6:
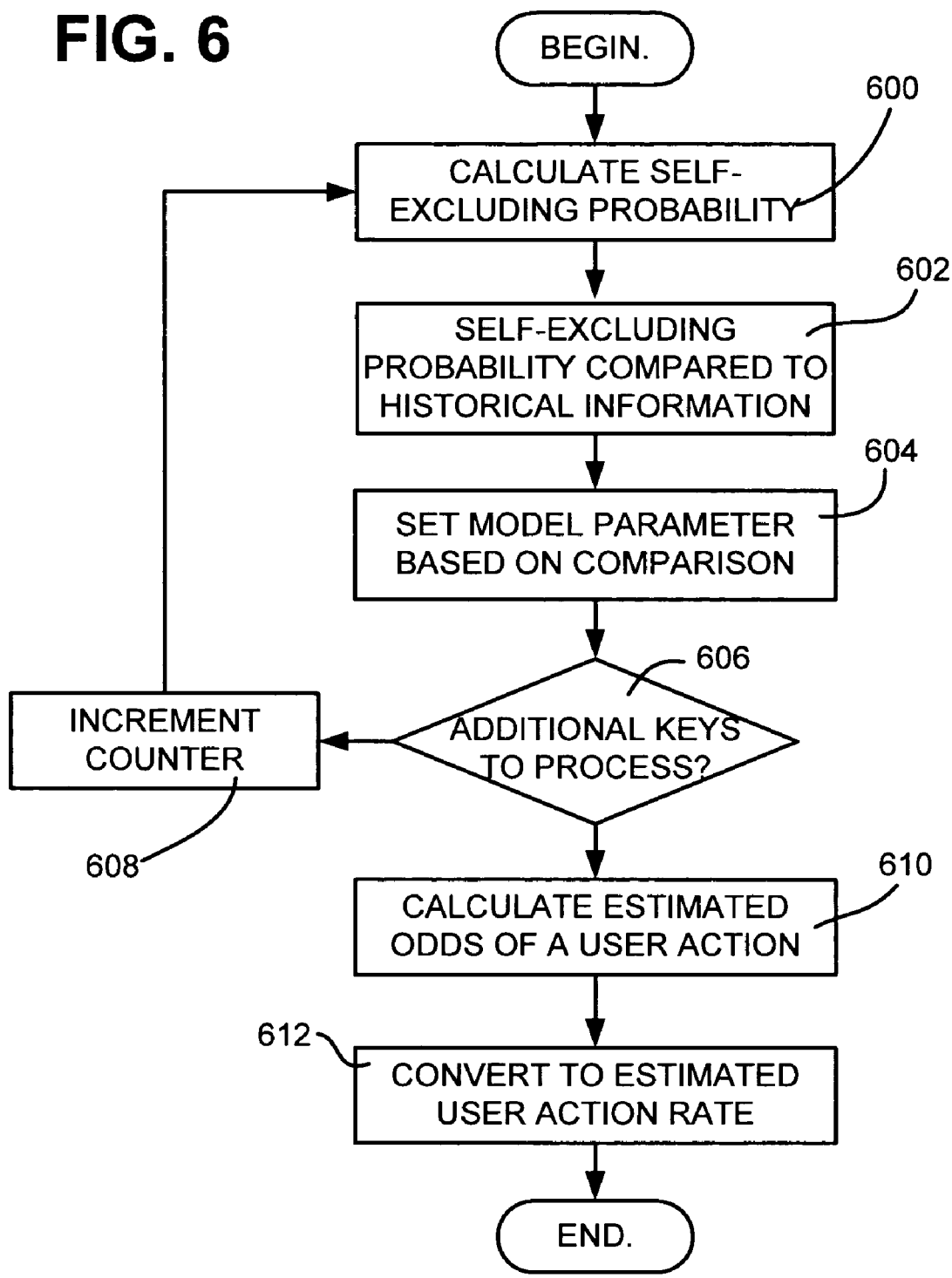
FIG. 6 is a flow chart illustrating exemplary procedures for estimating the user action rate of an advertisement.

FIG. 6 is a flow diagram illustrating one implementation of the prediction model of act 506 for generating an estimated UAR for each trigger/advertisement pair. Although the final UAR is defined in terms of the probability of a user action occurring, the estimated UAR for a given trigger/advertisement pair may equivalently be represented as the user action odds (q) as described above. In accordance with one implementation of the principles of the invention, the user action odds may be calculated by multiplying the prior user action odds ($q_0$) by a model parameter ($m_i$) associated with each selected key ($k_i$), henceforth referred to as an odds multiplier. Such a solution may be expressed as:

$$q = q_0 \cdot m_1 \cdot m_2 \cdot m_3 \ldots m_n$$

In essence, the odds multiplier for each key may be a statistical representation of the predictive power of this key in determining whether or not a user action occurs. In one implementation, the odds multiplier for each key may represent the observed change in the user action rate for trigger/advertisement pairs that select this key (aggregated over the historical data) that cannot be modeled or "explained" using any of the other keys.

In one implementation consistent with principles of the invention, the model parameters described above may be continually modified to reflect the relative influence of each key on the estimated UAR for each given trigger/advertisement pair. Such a modification may be performed by comparing the predicted probability that a user action will occur disregarding the given key to the measured historical user action rate. In this manner, the relative value of the analyzed key may be identified and refined.

Turning specifically to FIG. 6, for each selected key ($k_i$), an average self-excluding probability ($P_i$) may be initially calculated or identified (act 600). In one implementation, the self-excluding probability ($P_i$) is a value representative of the relevance of the selected key and may measure the resulting user action rate of a trigger/advertisement pair when the selected key's model parameter ($m_1$) is removed from the estimated UAR calculation. For key 3, for example, this may be expressed as:

$$P_3 n = ((q_0 \cdot m_i \cdot m_2 \cdot m_3 \ldots m_n)/m_3)/(((q_0 \cdot m_i \cdot m_2 \cdot m_3 \ldots m_n)/m_3)+1).$$

In one embodiment, the self-excluding probability for each key may be maintained as a moving average, to ensure that the identified self-excluding probability converges more quickly following identification of model parameter for each selected key. Such a moving average may be expressed as:

$$P_{in}(avg) = \alpha P_{i(n-1)}(avg) + (1-\alpha) P_{in},$$

where $\alpha$ is a statistically defined variable very close to 1 (e.g., 0.999) used to control the half-life of the moving average. As shown in the above expression, the value of $P_i$ for the current number of impressions (n) is weighted and averaged by the value of $P_i$ as determined at the previous impression (e.g., n−1).

Next, the average self-excluding probability ($P_i(avg)$), may be compared to historical information relating to the number of impressions observed and the number of user actions observed for the observed impressions (act 602). The model parameter associated with the selected key may then be generated or modified based on the comparison of act 602 (act 604).

Figure 7:
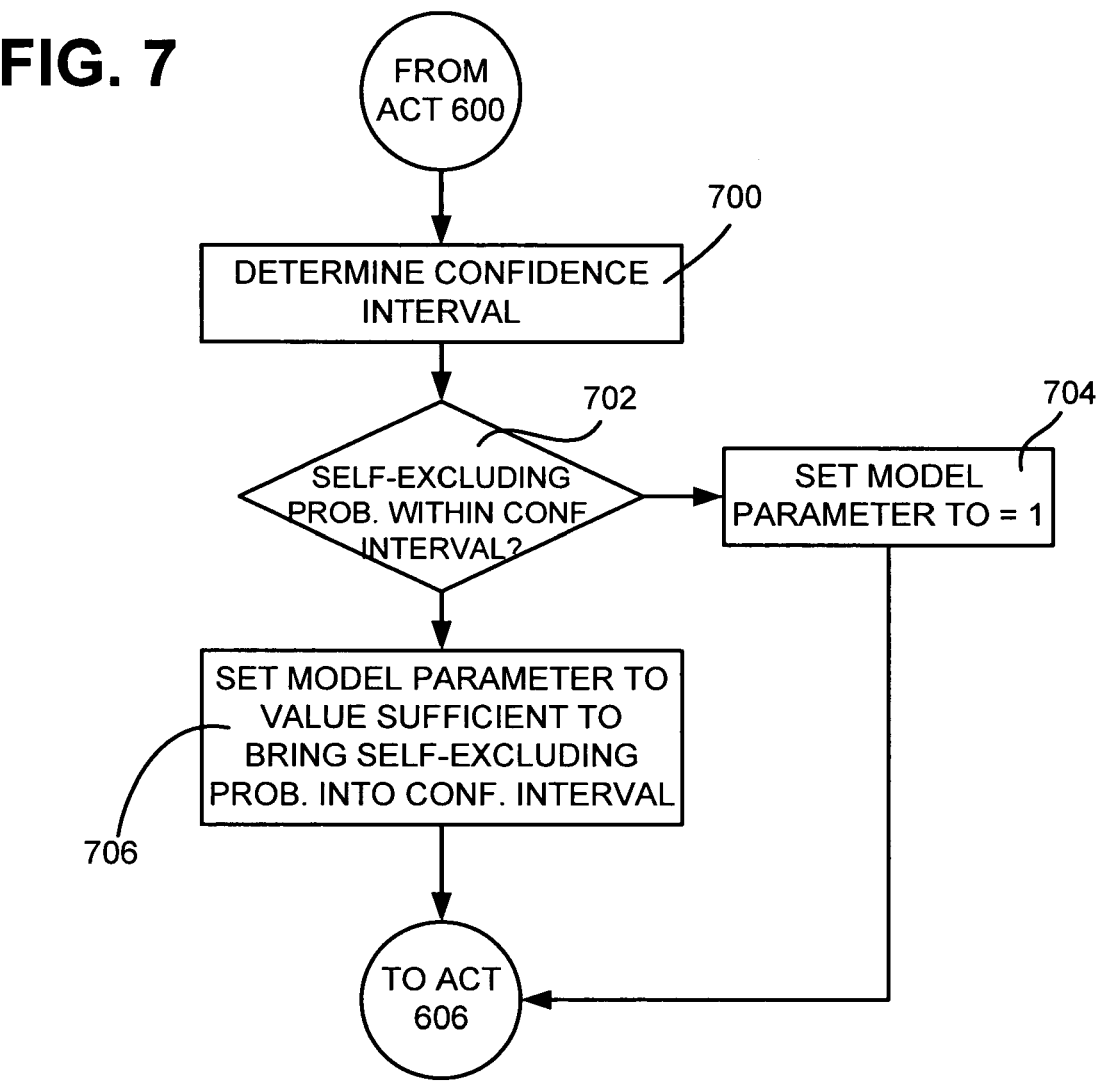
FIG. 7 is a flow chart illustrating exemplary procedures for generating model parameters.

FIG. 7 is a flow diagram illustrating one exemplary implementation of the processing of acts 602-604 of FIG. 6. Initially, a confidence interval relating to the odds of a user action may be determined (act 700). Using a confidence interval technique enables more accurate and stable estimates when keys having lesser amounts of historical data are used. In one implementation, the confidence interval includes a lower value $L_i$ and an upper value $U_i$ and is based on the number of impressions ($n_i$) and user actions ($j_i$) observed for the selected key. For example, the confidence interval may be an 80% confidence interval $[L_i, U_i]$ calculated in a conventional manner based on the number of impressions and user actions observed. Following confidence interval calculation, it may then be determined whether the average self-excluding probability ($P_i(avg)$) falls within the interval (act 702). If so, it may be determined that the selected key ($k_i$) has no effect on the clickthrough rate and its model parameter ($m_i$) may be set to 1, effectively removing it from the estimated UAR calculation (act 704). However, if it is determined that $P_i(avg)$ falls outside of the confidence interval, then the model parameter for the selected key ($m_i$) may be set to the minimum adjustment necessary to bring the average self-excluding probability ($P_i(avg)$) into the confidence interval (act 706). This calculation may be expressed mathematically as:

$$m_i = [L_1(1-P_i(avg))]/[P_i(avg)(1-L_i)]$$

Consider the following example: suppose that 200 user actions ($j_i$) and 10,000 impressions ($n_i$) have been observed for a key ($k_i$) representing the fact that the user is in the United States and the query is related to used cars. Furthermore, suppose that the average predicted user action probability ($P_i(avg)$) for these impressions (not including the effect of this key) is 0.015. The 80% confidence interval for 200 user actions out of 10,000 impressions is [0.0182,0.0219], so we would set $m_i$ to the model parameter required to transform 0.015 into 0.0182. When submitted into the above expression, this value turns out to be 1.217. In other words, we presume that the presence of this key means that the user is about 20% more likely to perform the measured action than would otherwise be expected.

Returning now to FIG. 6, once the model parameter for the selected key is calculated, it may be determined whether additional keys remain to be processed (i.e., whether $k_i < k_m$) (act 606). If additional keys remain to be processed, the counter variable i may be incremented (act 608) and the process may return to act 600 to process the next key. Once model parameters for all keys have been calculated or modified, the estimated odds of a user action may be calculated using the equation $q = q_0 \cdot m_1 \cdot m_2 \cdot m_3 \ldots m_n$ (act 610). The odds may then be converted to an estimated user action probability or user action rate using the conversion convention described above (act 612).

In one implementation consistent with principles of the invention, the UAR prediction model may be trained by processing log data as it arrives and accumulating the statistics mentioned above (e.g., impressions, user actions, self-excluding probabilities, etc.). As additional impressions occur, the confidence intervals associated with each key may shrink and the parameter estimates may become more accurate. In an additional implementation, training may be accelerated by reprocessing old log data. When reprocessing log data, the estimated click probability may be recalculated using the latest parameter or odds multiplier values. This allows the prediction model to converge more quickly.

In an alternative implementation consistent with principles of the invention, a Bayes estimation can be used to calculate the model parameter for each key. In a Bayesian implementation, a prior distribution (g) of model parameters may be initially determined, such that g(log m) represents the prior probability that a given key has an odds multiplier m. The given model parameter $m_i$ may then be set to be the value of m that maximizes the product:

$$f(\log m) = g(\log m) h(\log m)$$

where h(log m) is proportional to the probability of observing j, user actions out of $n_i$ impressions using the given value of m:

$$h(\log m) = pow(p,j_i) pow(1-p, n_i-j_i), \text{ where}$$

$p = (m \cdot p_i)/(1-p_i+m \cdot p_i)$ and pow(x,y) represents raising x to the power of y. It should be noted that the above expressions uses log(m) rather than m in order to make the distributions more symmetric.

Exemplary Configuration

Figure 8:
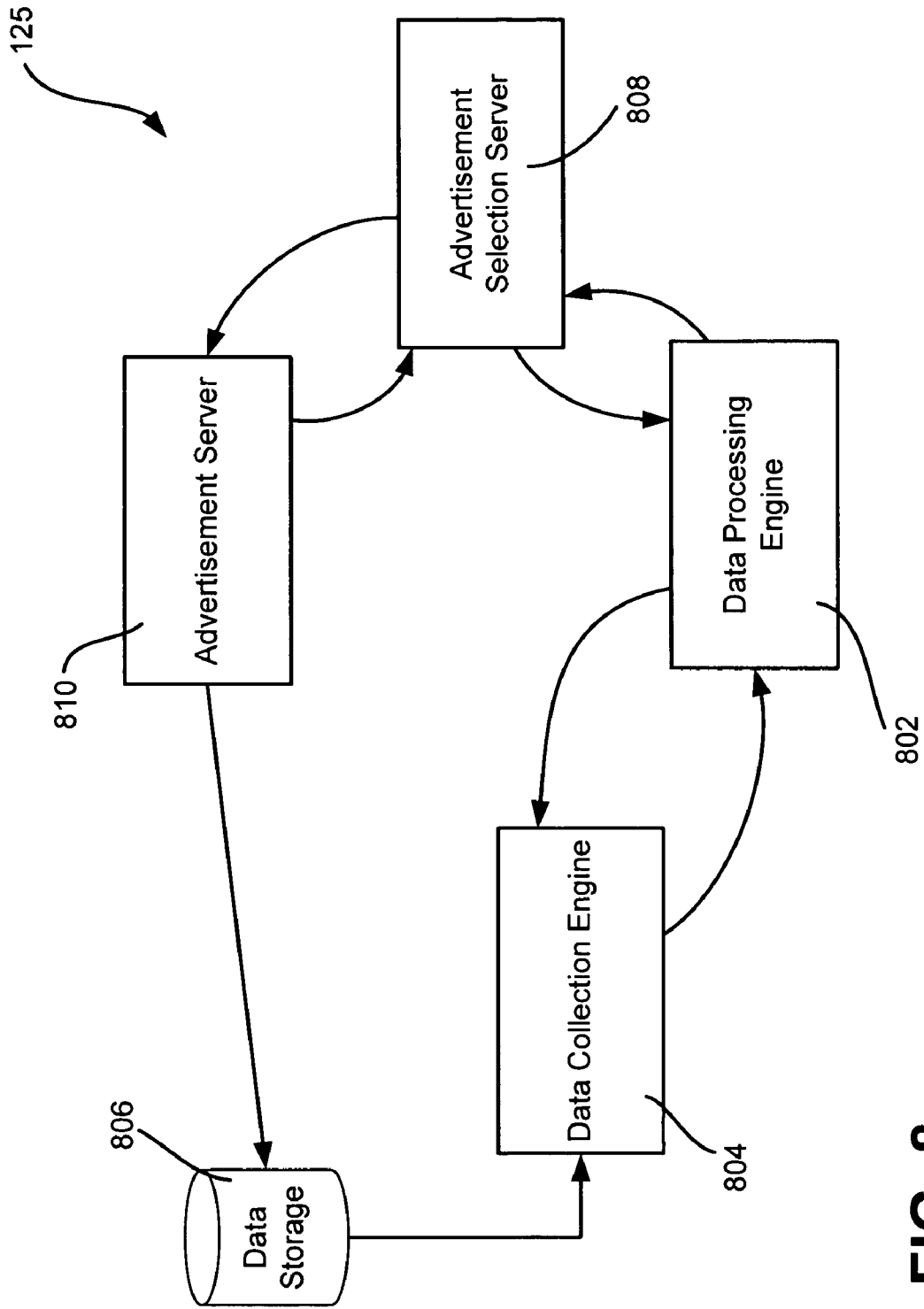
FIG. 8 is a block diagram illustrating one embodiment of the advertisement selection system of FIG. 1.

FIG. 8 is a block diagram illustrating one exemplary configuration of advertisement selection system 125 for selecting and displaying advertisements in response to queries received from users. Advertisement selection system 125 may include data processing engine 802, a data collection engine 804, data storage 806, an advertisement selection server 808, and an advertisement server 810. Although a discrete number of distinct system components has been identified, it should be understood that system 125 may include more, fewer, or a different arrangement of components.

In operation, data processing engine 802 may receive a stream of data from data collection engine 804, where each update includes at least a key and a value associated with the key. Once received, data processing engine 702 may apply a rule or rules to the data regarding how to combine multiple values for the same key. For example, received values may include the number of impressions, the number of observed user actions, and the self excluding probability. Rules may then be used to combine multiple values for the same key. For example, values for impressions may be added, values for user actions observed may be added, and the self excluding probability may be updated in accordance with a predetermined methodology.

Data collection engine 804 may operate to collect query and advertisement information from data storage 806 and generate the update stream sent to data processing engine 802. In one implementation consistent with principles of the invention, the query and advertisement information may include log files, such as query logs, click logs, etc. Data collection engine 804 may perform a lookup from data processing engine 802 to retrieve the prior cumulative data associated with the keys. This data is then used to calculate the updated model parameters for the identified keys in the manner described above. Updates for the identified keys are then forwarded to data processing engine 802.

Advertisement selection server 808 may operate to receive a query and associated set of candidate advertisements from advertisement server 810. Using the prediction model described above, advertisement selection server 808 may initially identify the set of keys to be used in estimating the UAR for each query/advertisement combination. Advertisement selection server 808 then retrieves the data associated with the keys from data processing engine 802. Once the key data has been received, advertisement selection server 808 may calculate estimated UARs for each candidate advertisement in the manner described above. These estimated UARs may then be passed to advertisement server 810 for use in determining which advertisements to display to the user.

Advertisement server 810 may serve a selected grouping of advertisements in combination with search results relating to the query based on a ranking associated with the estimated UARs. In response to the ad serving, a user action associated with one or more of the advertisements may be observed. Following each of query reception, ad serving, and observed user actions, advertisement server 810 may generate or update the data maintained in data storage 806.

In one embodiment, key data that has not been accessed within a predetermined period of time is considered to be no longer used and is removed from the servable data. Examples of old data may include identifiers for obsolete advertisements, etc. In another implementation, a total number of key impressions is tracked within a predetermined time period (e.g., one year). If the total number of key impressions observed during the time period is less than a predetermined threshold, the data is considered statistically irrelevant and is removed from the servable map file. By filtering the data used by the UAR prediction model, performance and accuracy of the model may be increased.

CONCLUSION

As described herein, the performance of an on-line advertisement may be accurately predicted.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

In addition, one or more of the described acts may be performed by server 120 or another device (or combination of devices). In one implementation, one or more of the described acts may be performed by a client 110.

Moreover, while series of acts have been described with regard to FIGS. 5-7, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method for estimating on-line advertisement performance, the method comprising:
   identifying, using a processor associated with a server device, a candidate advertisement in response to an advertisement trigger;
   identifying, using a processor associated with a server device, a set of at least one key pair relating to features of the candidate advertisement and the advertisement trigger, or a combination of the candidate advertisement and the advertisement trigger, where the at least one key pair identifies a type of the features and a value of the features; and
   estimating, using a processor associated with a server device, candidate advertisement performance based on historical data relating to the at least one key pair, where estimating advertisement performance includes:
      identifying, using a processor associated with a server device, a prior likelihood that a defined user action associated with the candidate advertisement will be observed;
      calculating, using a processor associated with a server device, for each key pair in the set of at least one key pair, a parameter representing a statistical impact of the key pair on the likelihood that a defined user action associated with the candidate advertisement will be observed, where the at least one parameter is based on the historical data associated with the key pair.

2. The method of claim 1, where the advertisement trigger includes a received search query.

3. The method of claim 1, where the advertisement trigger includes a web document.

4. The method of claim 1, further comprising:
   identifying the at least one key pair based on properties of the advertisement trigger.

5. The method of claim 1, further comprising:
   filtering a key from the at least one key pair based on predetermined criteria.

6. The method of claim 5, where the predetermined criteria includes a time since an impression relating to the at least one key was observed.

7. The method of claim 6, where the predetermined criteria includes a number of impressions relating to the at least one key within a predetermined time period.

8. The method of claim 1, where estimating candidate advertisement performance, further comprises:

estimating a probability that the candidate advertisement will be clicked.

9. The method of claim 1, where estimating candidate advertisement performance, further comprises:
estimating a probability that a user will make a purchase associated with the candidate advertisement.

10. The method of claim 1, where estimating candidate advertisement performance, further comprises:
estimating a probability that a user action associated with the candidate advertisement will be observed.

11. The method of claim 1, where the estimating a candidate advertisement performance further comprises:
estimating advertisement performance based on the prior likelihood and the parameter for each key in the at least one key pair.

12. The method of claim 11, where the at least one parameter representing the statistical impact of each key pair in the at least one key pair has a multiplicative effect on the odds that the user action will be observed.

13. The method of claim 12, where calculating the parameter for a given key pair in the set of at least one key pair, further comprises:
calculating a self-excluding probability representing an estimated likelihood that the user action associated with the candidate advertisement will be observed when disregarding the parameter associated with the given key pair;
identifying a number of impressions relating to the given key pair and a number of user actions relating to the given key pair based on the historical data; and
setting the parameter for the given key pair based on the self-excluding probability and the number of impressions.

14. The method of claim 13, further comprising:
identifying a confidence interval based on the number of impressions relating to the given key pair and a number of user actions relating to the given key pair.

15. The method of claim 14, further comprising:
determining whether the self-excluding probability falls within the confidence interval;
setting the parameter for the given key pair to 1 if it is determined that the self-excluding probability falls within the confidence interval, thereby rendering the given key pair statistically invisible; and
setting the parameter for the given key pair equal to the minimum adjustment necessary to bring the self-excluding probability within the confidence interval if it is determined that the self-excluding probability does not fall within the confidence interval.

16. The method of claim 14, where calculating the self-excluding probability further comprises:
calculating a moving average of the self-excluding probability.

17. The method of claim 1, where the historical data relating to the at least one key includes log data generated upon observation of prior impressions relating to the at least one key pair.

18. A method, comprising:
receiving, using a processor associated with a server device, an advertisement trigger from a user;
identifying, using a processor associated with a server device, a candidate advertisement for display to the user;
identifying, using a processor associated with a server device, a set of key pairs having characteristics associated with the advertisement trigger and the candidate advertisement;
retrieving, using a processor associated with a server device, historical statistical information for each key in the set of key pairs;
calculating, using a processor associated with a server device, a model parameter for each key pair in the set of key pairs, the model parameter representative of a statistical relevance of the characteristics associated with the key and based on the retrieved historical statistical information; and
calculating, using a processor associated with a server device, an estimated user action rate for the candidate advertisement based on a prior user action probability associated with the candidate advertisement and each of the calculated model parameters.

19. The method of claim 18, where the historical statistical information for each key pair includes a number of impressions observed for the key pair and a number of user actions observed for the key pair.

20. The method of claim 19, where calculating a model parameter for a first key pair in the set of key pairs, includes:
calculating a self-excluding probability for the first key pair representing a likelihood of observing a user action when removing the first key pair from consideration;
calculating a confidence interval based on the number of impressions and the number of user actions historically observed for the first key pair;
determining whether the self-excluding probability falls within the confidence interval;
setting the model parameter for the first key pair equal to 1 when it is determined that the self-excluding probability falls within the confidence interval; and
setting the model parameter for the first key pair equal to a minimum adjustment necessary to bring the self-excluding probability within the confidence interval when it is determined that the self-excluding probability does not fall within the confidence interval.

21. The method of claim 18, where calculating an estimated user action rate further comprises calculating the estimated user action rate as a product of the prior probability and the model parameters for each key pair in the set of key pairs.

* * * * *

UNITED STATES PATENT AND TRADEMARK OFFICE
CERTIFICATE OF CORRECTION

PATENT NO. : 7,818,208 B1 Page 1 of 1
APPLICATION NO. : 11/167581
DATED : October 19, 2010
INVENTOR(S) : Eric Hugh Veach It is certified that error appears in the above-identified patent and that said Letters Patent is hereby corrected as shown below:

Column 12, claim 5, line 58, following the word "key" insert --pair--.

Column 12, claim 6, line 62, following the word "key" insert --pair--.

Column 12, claim 7, line 65, following the word "key" insert --pair--.

Column 13, claim 11, line 14, following the word "key" insert --pair--.

Column 14, claim 17, line 2, following the word "key" insert --pair--.

Column 14, claim 18, line 21, following the word "key" insert --pair--.

Signed and Sealed this

Twenty-first Day of December, 2010

David J. Kappos
*Director of the United States Patent and Trademark Office*